June 26, 1928.

J. M. HOPWOOD

SEPARATOR AND METHOD OF EXTRACTING EXTRANEOUS
MATERIAL FROM A FLUID STREAM

Filed July 24, 1925

NORMAL WATER LEVEL OF BOILER

WITNESSES

INVENTOR

June 26, 1928.  1,674,780
J. M. HOPWOOD
SEPARATOR AND METHOD OF EXTRACTING EXTRANEOUS
MATERIAL FROM A FLUID STREAM
Filed July 24, 1925   3 Sheets-Sheet 2

WITNESSES

INVENTOR

June 26, 1928. 1,674,780
J. M. HOPWOOD
SEPARATOR AND METHOD OF EXTRACTING EXTRANEOUS
MATERIAL FROM A FLUID STREAM
Filed July 24, 1925 3 Sheets-Sheet 3

FIG.4.

WITNESSES
INVENTOR

Patented June 26, 1928.

1,674,780

UNITED STATES PATENT OFFICE.

JOHN M. HOPWOOD, OF DORMONT, PENNSYLVANIA.

SEPARATOR AND METHOD OF EXTRACTING EXTRANEOUS MATERIAL FROM A FLUID STREAM.

Application filed July 24, 1925. Serial No. 45,839.

This invention relates to separators such as are employed in extracting extraneous material from fluids or gases and it also relates to an improved method of extracting extraneous material from fluids or gases.

An object of the invention is to produce a simpler and more effective method of removing extraneous material from a fluid or gas than has heretofore been employed; and also to produce a simpler and more effective apparatus for accomplishing this result than has heretofore been employed.

It has heretofore been possible to extract a portion of the extraneous material carried or entrained by a stream of gaseous fluid but, even where the conditions were most favorable, it has been prohibitive, from the standpoint of the first cost and operating expense, and in fact impossible to provide and operate an apparatus which will remove substantially all the extraneous material from the fluid. For example, it has been possible to remove a portion of the water carried by a stream of steam, but heretofore it has been impossible to produce a steam separator or a method of separating moisture from steam moving at high and variable velocities which will extract substantially all the moisture entrained by the steam and will deliver steam approximating the characteristics of "dry and saturated" steam, when the steam treated, or passed through the separator originally contains a high percentage of moisture.

With my invention, it is possible to separate extraneous moisture and other extraneous material from steam delivered from a boiler or steam generator even when the generator is priming badly, and to deliver approximately clean dry steam without resorting to secondary heating or superheating devices and without subjecting the steam to the action of whirling or moving parts.

A further object of my invention is therefore to produce a simple and effective steam separator which will deliver steam approximating the characteristics of "dry and saturated" steam even where the steam delivered to the separator contains a high percentage of moisture and even where the steam traversing the separator is moving at high and variable velocities.

These and other objects which will be made more apparent throughout the further description of my invention are attained by means of apparatus embodying the features herein described and illustrated in the drawings accompanying and forming a part hereof.

The method forming a part of my invention includes subjecting a whirling stream of fluid moving at a high lineal velocity to the action of a primary collecting surface, then abruptly changing the lineal direction of the flow, and consolidating the stream without materially reducing its whirling velocity. The stream is then subjected to the collecting action of a secondary collecting surface but under such conditions that the entraining and scouring action of the stream on the surface is not only minimized but is progressively decreased along the surface in the direction of lineal flow until it is substantially nil. Under such conditions, extraneous material, such as moisture, collected on the surface is capable of and does respond to gravity and flows along the surface in opposition to the entraining force of the fluid.

Another important feature of my invention is that the extraneous material collecting on the surface is continuously and forcibly withdrawn from the surface by the entraining action of the portion of stream of fluid before reversal and is then acted on by this portion of the stream and discharged by it from the separator by reason of centrifugal force.

In fulfillment of the objects of my invention, the apparatus embodying the invention is simple both in construction and in mode of operation, but is so formed and proportioned that it is capable of carrying out the method herein set forth.

In the drawings, I have illustrated a separator primarily adapted to separate such extraneous material as moisture from steam, but it will be apparent to those skilled in the art that the apparatus may be employed for removing similar extraneous material from other gaseous fluids.

As illustrated, the separator consists of a substantially cylindrical separating chamber 5 enclosed within a casing having a substantially cylindrical wall 6 and an end wall 7, shown as a substantially flat bottom. Fluid is delivered to the chamber through an annular inlet port 8 which is located opposite to the end wall 7 and is preferably located immediately adjacent to the cylindrical wall 6. An annular series of inclined radial blades 9 is associated with the inlet port 8 and is so arranged that the fluid traversing the port is directed toward the end wall 7 but at the same time is given a high rotary or whirling velocity. A tubular collector 10 is located between the chamber 5 and a fluid outlet port 11. The collector 10 is provided with a substantially cylindrical collecting surface 12 which is surrounded by the inlet port 8 and extends from that port toward the outlet port 11. The surface 12 is of less diameter than the inlet port 8 but is of greater diameter than the outlet port 11 and is substantially coaxial with both ports. In addition to this, it is preferably so located with relation to the end wall 7 that its longitudinal axis (projected) extends at right angles to the end wall 7. The outlet port 11 is provided with a re-entrant annular flange 13 which is substantially concentric with the surface 12 and intervenes between a portion of that surface and the port 11. As illustrated, the flange 13 is formed on the tubular member 10 and is so located with reference to the surface 12 as to form an annular pocket 14 in which the surface 12 terminates and which is completely shielded by the flange 13.

Figure 1:
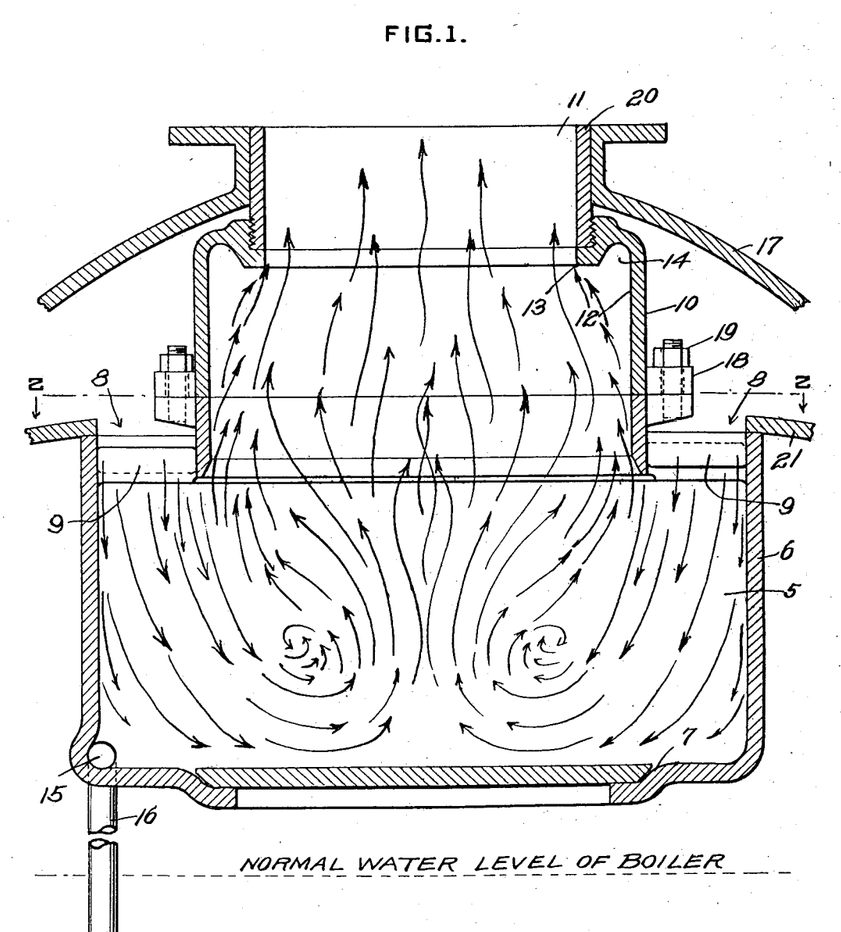
Figure 1 is a vertical sectional view illustrating a separator embodying my invention and which may be employed in carrying out the method forming a feature of my invention.

A liquid discharge port 15 is provided at or near the junction of the wall 6 and end wall 7. This port is preferably tangentially located and communicates with a discharge pipe 16. Where the separator is employed as a steam separator, it is preferably located within the steam drum or steam space of the boiler, and the pipe 16 preferably projects downwardly to a point somewhat below the normal water level of the boiler. In such installations, the separator is associated with the steam delivery port of the boiler in the manner shown in Fig. 1 where the boiler's shell 17 is shown in fragmentary section.

For convenience of assembly and manufacture, the separator is preferably formed in two parts, the line of division extending through the tubular member 10 and the parts being secured together by means of suitable lugs 18 and bolts 19. The flange 13 is also preferably formed so that it may be screwed onto a bushing 20 located within the outlet port of the boiler and forming the outlet port for the separator. This bushing is, of course, rigidly secured to the shell of the boiler.

Figure 2:
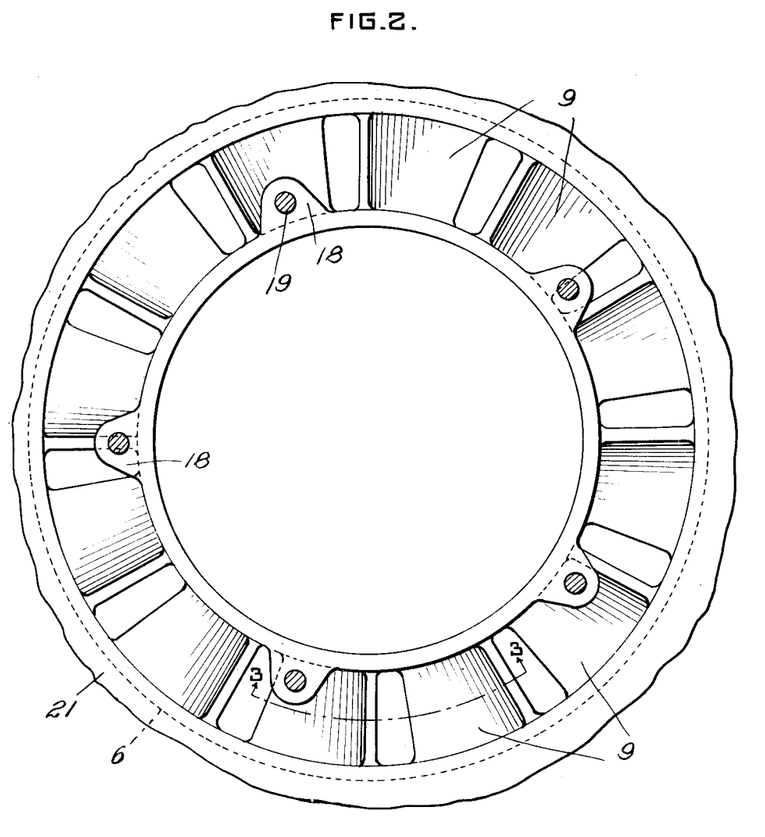
Fig. 2 is a plan view of the apparatus shown in Fig. 1 along the line 2—2 of Fig. 1.
Figure 3:
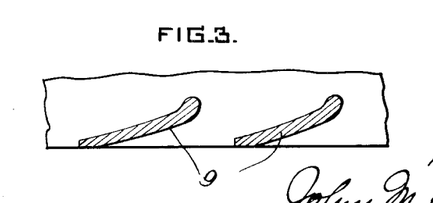
Fig. 3 is a fragmental sectional view illustrating a detail of my invention.

For the purpose of shielding the inlet port 8 from excess moisture, which may be delivered with the steam when the boiler is priming or frothing, I preferably employ an annular shield 21 which is mounted on the cylindrical wall 6 of the separating chamber and extends outwardly from that chamber while drooping slightly so that its outer edge is somewhat below the upper edge of the wall 6. This shield is shown broken away in Figs. 1 and 2.

In carrying out the method forming a part of my invention, I deliver the steam, from which the extraneous moisture is to be extracted, to the separating chamber 5 through the annular inlet port 8 at a high lineal velocity. This velocity is variable, since it depends on the drop in fluid pressure through the separator or the drop in pressure at the outlet port 11 below that at the inlet port 8. The vanes 9 impart a high whirling or rotary velocity to the incoming stream and direct it toward the bottom 7 of the separating chamber. The relation of the annular inlet port and the cylindrical wall 6 of the separating chamber is such that the annular stream of steam enters the chamber immediately adjacent to the inner surface of the wall 6 and that surface not only confines the whirling annular stream but actually contacts with at least the outer portion of the stream.

The fluid entering the chamber surrounded by the wall 6 is directed downwardly and laterally by the radial inclined blades 9. This produces, in effect, a plurality of downwardly projected streams of fluid which immediately unite to form an annular stream and which are directed in an annular or swirling path by the cylindrical wall 6. The bottom 7 of the chamber, in effect, forms a deflector which abruptly reverses the direction of flow of the annular stream. The stream so reversed is consolidated by reason of the fact that it passes upwardly toward the outlet port 11 through, and in contact with, the incoming annular stream. With this arrangement the rotary velocity of the consolidated stream is not materially reduced but is, in fact, augmented by the rotary velocity of the annular stream.

The centrifugal action occasioned by the rotor velocity of the fluid stream causes the heavier extraneous material to be thrown outwardly onto the wall 6. This wall is preferably formed of such material as is readily wet by the extraneous liquid, and is imperforate and so formed that it does not prevent a uniform flow across its surface but merely imposes a confining and directing action on the extraneous material collected by it. The material collected on the wall tends to flow toward the bottom of the chamber 5 and this tendency is materially accentuated and the flow is accelerated by the entraining and scouring action of the stream of fluid on the inner surface of the wall 6. The result is that the extraneous liquid discharged from the stream is impelled, with considerable velocity, in a spiral path along the inner surface of the wall 6 to the bottom of the chamber 5. The liquid, so collected at the bottom of the chamber 5, is also subjected to the entraining action of the whirling stream of fluid and is, therefore, held outwardly by the centrifugal force occasioned by its rotary velocity and is thereby discharged through the port 16. It will be apparent that the centrifugal action will raise the pressure of the liquid collected from the fluid stream somewhat above the fluid pressure existing within the chamber 5, and that, therefore, the liquid is capable of being discharged through the port 16 even into a region of pressure slightly above that existing in the chamber 5.

The annular stream of steam is consolidated and reversed in direction of its lineal flow by the combined action of the bottom 7 of the separating chamber and the position of the outlet port 11 with relation to the bottom 7. The reversal in lineal direction is, however, accomplished without materially reducing the rotary velocity of the fluid stream with the result that the incoming annular portion of the stream surrounds the outgoing consolidated portion but moves at substantially the same rotary velocity as the consolidated portion. Such extraneous moisture as is discharged from the consolidated stream, immediately after its reversal in lineal direction, is received by the incoming annular portion of the fluid stream and is discharged by it onto the collecting surface of the wall 6.

In order to ensure removal of substantially all the extraneous moisture from the fluid, the consolidated stream is caused to traverse the tubular collector member 10, the surface 12 of which is formed of such material as is readily wet by the extraneous liquid, and is also imperforate and substantially smooth so that it imposes little or no resistance to the flow of liquid along it.

As stated, the collecting surface 12 is preferably located concentrically with the outlet port 11 but is of somewhat greater diameter than that port. The consolidation of the stream, at the time of its reversal in lineal direction of flow, is the result of the vortex action of the stream itself and also of the position of the port 11 with relation to the bottom 7 of the chamber 5. The vortex action tends to compress the reversed stream, and this, of course, is at the expense of some portion of the rotary energy or velocity of the stream. As the stream moves upwardly away from the region of maximum vortex influence, it tends to enlarge somewhat in diameter, but this tendency is overcome by the fact that the outlet port is of less diameter than the mean diameter of the chamber 5 and also by the fact that the consolidated portion of the stream is subjected to the confining action of the annular portion of the stream.

The result is that, while the consolidated stream may expand to substantially fill the inner or lower end of the tubular collector 10, the indirect action of the smaller outlet port 11 will tend to draw the steam away from the surface 12 with the result that the lower end of that surface is not subjected to an intense scouring and entraining action of the fluid, and in addition to this, the entraining and scouring action of the whirling stream progressively decreases along the surface 12 in the direction of lineal flow of the stream until it is substantially nil. This progressive decrease in the entraining action is also accentuated by the fact that the flange 13 overhangs a portion of the surface 12 and therefore directs the stream of outgoing fluid away from that surface. The flange also actually shields a portion of the surface 12 and thereby positively prevents the effect of the entraining action of the fluid from showing itself within the so-called pocket 14.

The extraneous liquid, thrown outwardly by the whirling stream traversing the collector 10, is received by the surface 12 and, because of the affinity of that surface for liquid, spreads out in a thin film which is held to the surface by the force of adhesion between the surface and the liquid. At the lower portions of the surface, this film is subjected to a slight entraining action and tends to move circumferentially around the surface. As the rate of liquid delivery to the surface increases, the thickness of the film increases, and the force of cohesion, being less than the force of adhesion, the excess liquid actually rolls on the adhesive film of liquid and moves in a spiral path along the surface thus rapidly building up the thickness of the upper portion of the film.

The propelling action of the fluid, however, decreases toward the outlet 11 with the result that the liquid delivered to the surface 12, collects in globules or in a thicker film toward the outlet and, under such conditions, the force of gravity acting on the larger globules or thicker film is such as to cause the liquid to run down the surface 12 to its lower edge. This movement of the liquid is substantially unimpeded by the entraining action of the fluid except that the liquid actually moves down along a spiral path, which indicates that the entraining action of the fluid even at the lower end of the surface 12, is not capable of completely overcoming the force of gravity acting on the larger globules or thicker film, and particularly where a downward movement of the globules or film has been initiated at a point on the surface 12 where the entraining and scouring action is materially less effective.

The liquid moving down the surface 12 moves into a zone which is subjected to the entraining action of the incoming annular portion of the fluid stream, and is actually entrained by the incoming stream, leaving the surface 12 in the form of a curtain of spray, which is immediately incorporated into the whirling annular portion of the stream and is thrown outwardly onto the surface of the wall 6 by the centrifugal force occasioned by the high velocity imparted to it by the incoming portion of the stream.

Under conditions of heavy liquid discharge, the curtain of spray actually shows itself as tending to concentrate into a series of more or less clearly defined jets corresponding in spacing to the spacing of the blades 9, and discharging in the direction of the whirling velocity of the fluid stream.

It will, of course, be apparent that the major portion of the liquid introduced with the gaseous fluid, for example, steam, is discharged onto the surface of the wall 6 as it first enters the chamber 5, but that some moisture is entrained with the fluid in its passage across the bottom 7 and is picked up by the vortex action of the stream at the time of reversing the direction of lineal flow of the fluid. A portion of this liquid, and such other liquid as may have passed the wall 6, is discharged from the consolidated whirling stream directly into the annular incoming stream and, as previously described, onto the collecting surface 12.

It will be apparent that it is extremely important to so locate the surface 12, with relation to the lines of fluid flow through the separator, that it is not exposed to an intense scouring and entraining action of the fluid. It will also be apparent that the surface 12 must be so positioned that the entraining effect of the fluid will progressively decrease to a point where it is substantially nil. If, for example, the surface 12 conformed approximately to the lines of fluid flow through the separator, it will be apparent that any moisture collected on that surface will move or tend to move along the surface by reason of the entraining action of the fluid and will pass out through the port 11 with the fluid, since there would be no tendency to check the entrained flow and to thereby permit the fluid to accumulate or build up to such an extent that gravity is rendered effective in propelling the accumulated liquid along the surface 12 in opposition to the entraining action.

Actual observation of the separator in action discloses the fact that little or no moisture passes the collecting surface of the cylindrical wall 6 except when large quantities of liquid, as compared to the gaseous fluid traversing the separator, are introduced into the separator. Under conditions of increasing liquid input, the collecting action of the surface 12 first shows itself by accumulating a thin film of liquid near its lower end. As the input of liquid increases, this film becomes wider and starts to thicken at its upper edge, forming more or less well-defined globules of liquid which move spirally down the surface 12 toward its lower edge. It is, therefore, apparent that after the film accumulated to a thickness, such that the adhesive action of the wetted surface 12 is ineffective, in resisting the gravitational pull on the liquid, a down flow is initiated and, after such a flow has been initiated, the entraining action of the fluid, even at the lower portions of the surface 12, is not sufficient to overcome the action of gravity or to check the flow, and the liquid is continuously discharged from the lower edge of the surface as previously described.

This discharge from the lower edge of the surface 12 is due to the fact that the annular stream of fluid entering the separator expands slightly immediately after passing the confining surfaces of the inlet port 8 and that it, therefore, has a sweeping or scouring action on the lower edge of the surface 12, which as shown in the drawings is beveled to a slightly enlarged diameter at its lower edge. The result is that the downwardly moving liquid on the surface 12 is discharged from the surface by the combined effect of this sweeping or scouring action and the cohesive effect of the liquid itself. Gravity, of course, plays a very important part, but the cohesive effect accentuates the effect of gravity in that each particle of liquid removed or torn from the lower edge of the surface 12 tends to drag with it adjacent liquid which has not as yet reached the zone of maximum entraining effect of the annular stream of incoming liquid. In addition to this, the rotation of the incoming and outgoing liquid is in the same direction, and consequently any liquid, depending from the lower edge of the surface 12, is subjected to the dislodging effect of this rotary velocity and, on being dislodged, immediately moves outwardly away from the outgoing stream and into the annular incoming stream.

It will also be apparent that the contraction of the consolidated stream, which is occasioned by employing the overhanging flange 13 of less diameter than the collecting surface 12, also aids in the discharge of extraneous moisture or liquid from the stream as it traverses the separator. The extraneous material such as liquid or moisture is substantially heavier than the entraining fluid itself, and consequently, while the fluid flow will readily adapt itself to the varying diameters of the stream, the heavier extraneous material will resist such variations in its path of flow but will tend to continuously move outwardly away from the center of rotation of the stream with the result that substantially all the extraneous moisture carried by the consolidated portion of the stream will be discharged therefrom before the stream has completed its passage through the collector 10. It will also be apparent that the upper portion of the surface 12, shielded as it is by the flange 13, will assure the accumulation of collected liquid in such quantities that the force of gravity acting on it will be sufficient to initiate and continue its downward flow to the lower edge of the collector.

It will also be apparent that the shielded pocket 14 absolutely prevents liquid, collected on the surface 12, from following the surfaces of the various passages and thereby passing out through the outlet port 11 with the fluid, because the upper portion of the surface 12 is not subjected to the entraining effect of the fluid, and consequently the only forces acting on liquid located on this portion of the surface 12 is the cohesive force between the liquid and the surface and the force of gravity.

In steam boiler installations, where the feed water contains an abnormal amount of impurities in suspension or where chemicals are introduced for the treatment of the boiler water, thereby increasing the amount of insoluble material in the water, it may be desirable to employ means for discharging such solid matter as may be collected by the separator without redelivering it to the water of the boiler.

Figure 4:
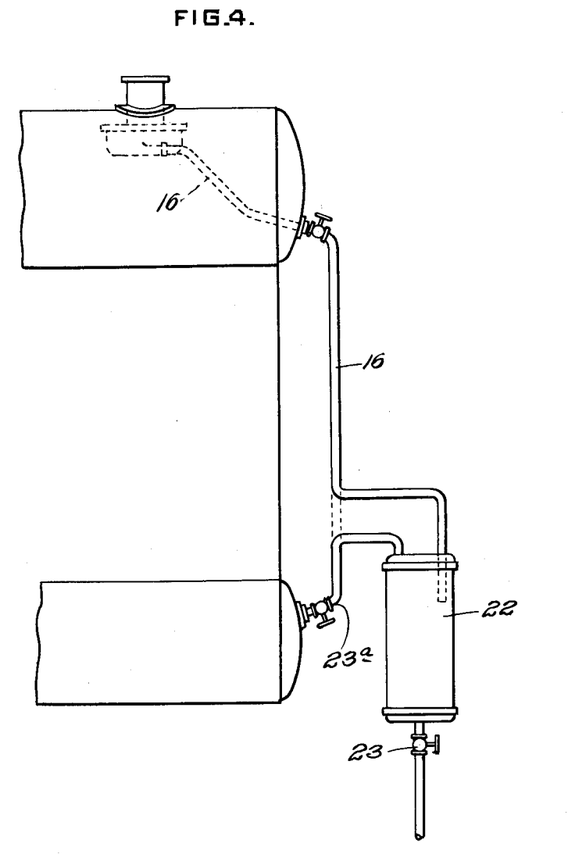
Fig. 4 is a diagrammatic view of a boiler and discloses one way of installing my improved separator.

In Fig. 4, I have shown an arrangement of apparatus which may be so employed.

As there illustrated, the discharge pipe 16 of the separator passes through the shell of the boiler and projects into an exterior tank 22 which is provided at its lower end with a blow-down valve and which communicates at its upper end with the water space of the boiler through a pipe 23ª. The tank in effect constitutes a settling drum and its capacity should be about 35 gallons per 1000 developed H. P. of the boiler with which it is associated. This tank may be blown down intervals and in this way eject the solid material collected by the separator. Where the boiler is provided with a mud drum, the pipe 23 may communicate directly with the mud drum or the tank 22 may be eliminated and the pipe 16 may connect with the mud drum.

While I have described a single form of apparatus embodying my invention and capable of carrying forward the method herein set forth, it will be apparent that various changes and modifications may be made therein and that the method herein set forth may be modified without departing from the spirit and scope of the invention as set forth in the appended claims.

What I claim is—

1. The method of extracting extraneous material from a whirling stream of gaseous fluid moving at a high lineal velocity, which consists in passing the stream through a cylindrical chamber, bounded by a cylindrical collecting surface for the purpose of collecting on said surface the extraneous material thrown outwardly from said stream by reason of the centrifugal forces occasioned by the whirling of the stream, and in causing the stream to contract while moving axially of said surface, thereby substantially eliminating the scouring and entraining effect of said stream on said surface in the direction of the lineal travel of the stream, and in discharging the extraneous material from said surface.

2. The method of collecting extraneous material from a whirling stream of gaseous fluid moving at a high lineal velocity, which consists in causing the stream to pass a collecting surface for the purpose of collecting the extraneous material thrown from the stream by centrifugal force, while substantially eliminating the scouring and entraining action of the stream on said surface in the direction of travel of the stream, by directing the stream away from said surface, and in discharging the extraneous material from said surface in a direction opposite to the direction of travel of said stream past said surface.

3. The method of extracting extraneous material from a stream of gaseous fluid, which consists in imparting rotary velocity to the stream, abruptly changing the lineal direction of flow of the stream, passing the stream through a cylindrical collecting tube, contracting the stream as it moves through said tube so that the scouring and entraining action of the fluid on the collecting surface of the tube is substantially eliminated, and in continuously removing extraenous material from the collecting surface of the tube by the entraining action of the portion of the stream prior to the reversal in its direction of lineal travel.

4. The method of extracting extraneous material from a stream of gaseous fluid moving at a high lineal velocity, which consists in imparting a whirling velocity to the stream by subjecting it to the action of stationary directing vanes while causing the stream to pass in an annular form axially along a substantially cylindrical directing surface consolidating the annular stream, contracting the stream so consolidated and passing the consolidated stream axially past a cylindrical collecting surface so that the entraining action of the stream on said surface is progressively decreased in the direction of lineal travel of the stream until it is substantially nil, and in continuously removing the extraneous material collected on said last mentioned surface, by the action of said annular portion of said stream.

5. A method of extracting extraneous moisture from steam, which consists in imparting a relatively high rotary velocity to a stream of steam moving at a high lineal velocity, while projecting the stream in an annular form collecting the extraneous moisture thrown outwardly by the centrifugal force occasioned by said rotary velocity consolidating and reversing the lineal direction of flow of said stream without materially reducing the rotary velocity thereof, subjecting the stream to the action of the annular incoming portion thereof and then to the action of a collecting surface, and removing liquid collecting thereon by the entraining action of the stream prior to the reversal in lineal direction thereof.

6. The method of extracting extraneous material from a stream of gaseous fluid, which consists in imparting rotary velocity to a stream moving at a high velocity, while maintaining the stream in substantially annular form, collecting a portion of the extraneous material from the fluid by centrifugal action, then in consolidating the stream and reversing the lineal direction of flow thereof without materially reducing its rotary velocity, and while maintaining the consolidated stream in contact with the annular portion thereof, successively subjecting the consolidated stream to the action of the annular rotating portion thereof and to the action of a collecting surface, and expelling the extraneous material collected by said surface by the entraining and expelling action of the annular portion of the stream.

7. The method of extracting extraneous material from a stream of gaseous fluid, which consists in imparting rotary velocity to a moving stream while projecting it downwardly in the form of an annular whirling stream, simultaneously reversing the lineal direction of said stream and consolidating the stream by causing it to move upwardly through and in contact with the annular portion thereof but without materially reducing the rotary velocity thereof, causing the consolidated stream to contract while passing through a cylindrical collecting surface, and expelling the extraneous material collected by said surface by the entraining action of the annular portion of the stream.

8. The method of extracting extraneous material from a stream of gaseous fluid, which consists in imparting rotary velocity to a moving stream of fluid while maintaining the stream in substantially annular form, subjecting the whirling stream to the collecting action of a substantially cylindrical confining surface, abruptly reversing the lineal direction of the stream and consolidating the stream while causing it to move upwardly through and in contact with the annular portion thereof but without materially reducing its rotary velocity, causing the consolidated stream to contract while passing a second collecting surface, and subjecting the extraneous material collected by said second surface to the expelling action of the annular portion of said rotating stream.

9. The method of extracting extraneous material from a stream of gaseous fluid, which consists in imparting rotary velocity to a substantially annular moving stream of fluid while maintaining the stream in substantially annular form, subjecting the whirling annular stream to the collecting action of an imperforate and substantially cylindrical confining surface, abruptly reversing the lineal direction of the stream without substantially reducing its velocity by causing it to consolidate and move in a reverse direction substantially along the axis of the rotating annular portion thereof and in contact therewith, and then subjecting the stream to the collecting action of a collecting surface removed from the maximum entraining effect of the stream, and collecting the extraneous material from said last-mentioned surface, by the entraining action of the annular portion of the stream.

10. The method of removing extraneous material from an annular stream of steam moving at a high lineal velocity, which consists in imparting rotary velocity to the annular stream, subjecting the whirling annular stream to the collecting action of an imperforate and substantially cylindrical surface, consolidating the stream and reversing the lineal direction of flow thereof without materially reducing its rotary velocity, subjecting the consolidated stream to the collecting action of a second substantially cylindrical, imperforate surface, while contracting said stream away from said second surface, and then in removing the moisture collected on said second surface by the entraining action of the annular stream before reversal and consolidation thereof.

11. The method of removing extraneous moisture from a stream of fluid moving at a high lineal velocity, which consists in causing the stream to assume an annular form and imparting rotary velocity thereto, subjecting the annular whirling stream to the collecting action of a substantially cylindrical, imperforate confining surface, consolidating and reversing the lineal direction of flow of the stream without materially reducing its rotary velocity, passing the reversed consolidated portion of the stream through the annular portion of the stream, and in contact therewith then subjecting it to the collecting action of a second substantially cylindrical surface, while reducing the diameter of the stream and thereby progressively decreasing its entraining action on said second collecting surface, removing the collected moisture from said second surface by the entraining action of the annular portion of the stream, and discharging all moisture removed from the stream by the centrifugal force occasioned by the rotation of the annular portion of the stream.

12. A method of extracting extraneous material from a gaseous fluid moving at a high lineal velocity, which consists in imparting rotary velocity to said stream, and subjecting the stream to the adhesive action of a collective surface and thereby collecting extraneous material from the stream in a continuously forming thin liquid film moving along said surface in the direction of fluid flow, abruptly changing the lineal direction of fluid flow without materially reducing the rotary velocity of the fluid, subjecting the stream to the adhesive action of a collecting surface, and collecting extraneous material thrown outwardly from said stream in the form of a continuously forming liquid film moving along said surface in a direction opposite to that of the lineal flow of said fluid.

13. A method of extracting extraneous material from a gaseous fluid moving at a high lineal velocity, which consists in imparting rotary velocity to said stream, and subjecting the stream to the adhesive action of a collective surface and thereby collecting extraneous material from the stream in a continuously forming thin liquid film moving along said surface in the direction of fluid flow, abruptly changing the lineal direction of fluid flow without materially reducing the rotary velocity of the fluid, subjecting the stream to the adhesive action of a collecting surface, collecting extraneous material thrown outwardly from said stream in the form of a continuously forming liquid film moving along said surface in a direction opposite to that of the lineal flow of said fluid, and in continuously discharging the liquid film so moving from said surface by means of the entraining action of said fluid prior to the change in the direction of lineal flow thereof.

14. A method of extracting moisture or similar extraneous material from a fluid stream, which consists in projecting the stream at a high lineal and whirling velocity in an annular form, consolidating the annular stream by causing it to move in a reverse direction of lineal travel in contact with and back through and beyond the annular portion thereof, but without materially reducing its rotary velocity, subjecting the consolidated stream to the collecting action of a cylindrical surface, and removing the material collected on said surface from said stream and projecting it in a direction opposite to the travel of the consolidated portion of the stream by the entraining action of the annular portion thereof.

15. A method of extracting moisture from a whirling stream of fluid moving at a high velocity, which consists in subjecting the stream of fluid to the collecting action of a cohesive surface, while directing the line of fluid flow away from said surface, and in discharging collected moisture from said surface in a direction opposite to that of the flow past said surface by the entraining action of said stream of fluid prior to its being subjected to said surface.

16. A separator comprising a chamber having an annular inlet port and a fluid outlet port concentrically located and arranged at one end of said chamber, a tangentially located liquid discharge port formed at the other end thereof, a cylindrical collecting tube between said chamber and said fluid outlet port, and an annular series of stationary directing vanes located within said inlet port and surrounding said collecting tube.

17. A separator comprising a cylindrical chamber having an annular fluid inlet port formed at one end thereof, and a liquid discharge port formed at the other end thereof, a cylindrical collecting tube in open communication with said chamber with its inlet edge forming the inner bounding edge of said inlet port, an annular series of stationary vanes located in said inlet port and surrounding the inlet edge of said tube, and means for contracting the fluid stream issuing from said chamber and traversing said tube.

18. A separator comprising a cylindrical chamber having an annular inlet port formed at one end thereof and a liquid discharge port formed at the other end thereof, a cylindrical collecting tube in open communication with said chamber and forming a bounding wall of said inlet port, and an annular series of directing vanes surrounding said tube and located in said inlet port immediately adjacent to the chamber end of said tube.

19. A separator comprising a substantially cylindrical collecting chamber having concentrically located fluid inlet and outlet ports formed in the upper end thereof and a tangentially located liquid discharge port formed in the lower end thereof, and a tubular collector located between said concentric ports, with its lower edge located immediately adjacent to said inlet port and forming a bounding edge thereof.

20. A separator comprising a cylindrical chamber, means for delivering an annular whirling stream of fluid into said chamber, comprising an annular inlet port, and an annular series of directing vanes located within said port, a collecting tube in open communication with said chamber having its chamber end forming a bounding edge of said inlet port, a fluid outlet port of less diameter than said tube and communicating therewith and a tangentially located liquid outlet port communicating with said chamber.

21. A separator comprising a cylindrical chamber having an annular inlet port formed at one end thereof and a tangentially located liquid discharge port formed in the other end thereof, a collecting tube in open communication with said chamber at the inlet port side thereof, and having its inner edge forming a bounding edge of said inlet port, an annular series of directing vanes associated with said inlet port and radiating from the outer surface of said tube and a reentrant flange formed at the outlet end of said tube and forming an outlet port for said chamber of less diameter than said tube.

22. A separator comprising a separator chamber, having a substantially cylindrical, smooth, imperforate bounding wall and having an annular fluid inlet port surrounded by said wall, a liquid discharge port located near the lower end of said wall and substantially tangentially located, relatively thereto, and a fluid outlet port removed from but concentrically located with relation to said inlet port, and vanes associated with said inlet port for imparting rotary velocity to the fluid passing therethrough, in combination with a substantially tubular collector located between said chamber and said outlet port and having a substantially smooth, imperforate collecting surface extending from said inlet port toward said outlet port, said outlet port being so located with relation to said surface that fluid issuing from said chamber is directed away from said surface as it traverses said surface and approaches said outlet port.

23. In combination in a separator, a substantially cylindrical separating chamber having an annular inlet port formed near the top thereof, an outlet port spaced from and located above said inlet port, and a tangentially located liquid discharge port located near the bottom of said chamber, a plurality of radially disposed directing vanes located in said inlet port for directing the fluid traversing said port downwardly and laterally, a tubular member extending above said inlet port and having its lower edge immediately adjacent to said inlet port, said tubular member being of less diameter than said inlet port and of greater diameter than said outlet port and establishing communication between said chamber and said outlet port.

24. The method of extracting extraneous material from a stream of gaseous fluid which consists in causing said fluid to flow in an annular whirling stream, separating material from said stream by centrifugal force and depositing the separated material upon a collecting surface, consolidating said annular stream and reversing the lineal direction of flow, extracting further material from the consolidated stream by centrifugal force and delivering such material to the annular stream for deposition on said collecting surface.

25. The method of extracting extraneous material from a stream of gaseous fluid which consists in causing said fluid to flow in an annular whirling stream, separating material from said stream by centrifugal force and depositing the separated material upon a collecting surface, consolidating said annular stream, extracting further material from the consolidated stream by centrifugal force, depositing such further material upon a second collecting surface and withdrawing such material from said second surface by the entraining action of said annular stream for deposition upon said first collecting surface.

26. The method of extracting extraneous material from a stream of gaseous fluid which consists in causing said fluid to flow in an annular whirling stream, separating material from said stream by centrifugal force and depositing the separated material upon a collecting surface, consolidating said annular stream and reversing the lineal direction of flow, extracting further material from the consolidated stream by centrifugal force, depositing such further material upon a second collecting surface and withdrawing such material from said second surface by the entraining action of said annular stream for deposition upon the said first collecting surface.

27. The combination with a steam boiler shell having an outlet-port, of a separator through which steam passes to said port and provided with a separating-chamber having an annular fluid-inlet-port, a cylindrical wall located concentrically with relation to said fluid-inlet-port and forming a passage leading to said boiler outlet-port, means for supporting said wall on said boiler shell beneath said outlet-port, and an annular series of vanes associated with said inlet-port for whirling the steam entering said chamber in a direction away from said passage.

In testimony whereof, I have hereunto subscribed my name this 21st day of July, 1925.

JOHN M. HOPWOOD.